United States Patent
Lock et al.

[11] Patent Number: 6,122,949
[45] Date of Patent: Sep. 26, 2000

[54] REFURBISHING DEVICE FOR A FISH TAPE

[76] Inventors: Robert Lock, 33 Pearl Ave., Holtsville, N.Y. 11742; Thomas Dziomba, 22 Birch Dr., Huntington Station, N.Y. 11746

[21] Appl. No.: 09/149,614

[22] Filed: Sep. 8, 1998

[51] Int. Cl.⁷ ..................................................... B21D 1/06
[52] U.S. Cl. ............................................ 72/160; 140/147
[58] Field of Search ....................... 72/160, 164; 140/147

[56] References Cited

U.S. PATENT DOCUMENTS

| | | | |
|---|---|---|---|
| 2,274,036 | 2/1942 | Buck | 72/160 |
| 2,348,539 | 5/1944 | Harper | 72/160 |
| 2,746,513 | 5/1956 | Kiesow | 72/164 |
| 5,560,239 | 10/1996 | Conlan | 72/160 |

FOREIGN PATENT DOCUMENTS

| | | | |
|---|---|---|---|
| 124835 | 11/1901 | Germany | 140/147 |
| 577457 | 5/1958 | Italy | 72/160 |
| 561559 | 1/1959 | Italy | 72/160 |
| 309642 | 11/1955 | Sweden | 140/147 |
| 564401 | 9/1944 | United Kingdom | 72/164 |
| 746765 | 3/1956 | United Kingdom | 72/164 |
| 765707 | 1/1957 | United Kingdom | 72/160 |

*Primary Examiner*—Daniel C. Crane
*Attorney, Agent, or Firm*—Michael I Kroll

[57] ABSTRACT

A refurbishing device (10) for a fish tape (12) comprising a base (14) and three studs (16). An assembly (18) is for attaching the studs (16) in equally spaced apart locations through the base (14), so that the studs (16) will extend from a bottom side (20) of the base (14). A handle (22) is also provided. An assemblage (24) is for securing the handle (22) to a top side (20) of the base (14) opposite from the studs (16). A person (28) can grasp the handle (22) with a first hand (30) and pull the coiled fish tape (12) between the studs (16) approximately three times with a second hand (32), thus reconditioning the fish tape (12) to like a new, straight and usable condition.

18 Claims, 6 Drawing Sheets

REFURBISHING DEVICE FOR A FISH TAPE

BACKGROUND OF THE INVENTION

1. Field of the Invention

The instant invention relates generally to an electricians fish tape and more specifically it relates to a refurbishing device for a fish tape. The advantages of the refurbishing device for a fish tape are twofold. The first would be time saving. An example of time saving would be the ability to complete installation of wiring after reconditioning of the fish tape in the field. The second advantage would be the expense. An example of expense would be the saving of labor cost for personnel to go and purchase a replacement and return, or return at another time with a new fish tape to complete the installation.

2. Description of the Prior Art

The electrician's fish tape has been provided in prior art to be used for fishing a wire through wall and floor space, conduit and pipe, or any other place you cannot readily get at by hand. It is light, strong and flexible, while its usual length is fifty to two hundred feet. Soapstone or talcum powder may be used to lubricate it. An opened or closed hook is formed at the end of the fish tape to engage the end of the wire. While these units may be suitable for the particular purpose to which they address, they would not be as suitable for the purposes of the present invention as heretofore described.

SUMMARY OF THE INVENTION

Electricians and other tradesmen involved with wire installation use a rolled steal bar known in the trade as a fish tape or snake. Two types that are commonly used are one sixteenth inch thick by one eighth inch wide or one sixteenth inch thick by one quarter inch wide. The range in length from fifth feet to two hundred feet. The fish tape is passed through conduits across suspended ceilings and many other places in new and existing structures to expedite the installation of electrical, communication, cable and alarm wiring. When the fish tape reaches its destination, wiring is attached to the end. The fish tape is then pulled back to its insertion point bringing the wire with it.

The fish tape in its new condition when laid on the floor would remain flat and move in a linear fashion away from the user as it is fed out. Over time, the stress placed on the fish tape by pulling it around the corners of two by fours and the edges of conduits coils the fish tape. Much the same way as when you place a ribbon between your thumb and the edge of a pair of scissors and pull the ribbon, it curls. The fish tape, which now travels in a circular path back to its origin when used in an open space or binds in conduits because of its wave form, is now useless.

The intent of the present invention is to provide tradesmen involved with the installation of concealed wiring, the ability to recondition in the field, a severely coiled and unusable fish tape to a like new, usable condition. The fish tape is laced through three metal studs of a hand held device. The fish tape is pulled through the studs approximately three times, thus reconditioning the fish tape to a like new, straight, and usable condition.

A primary object of the present invention is to provide a refurbishing device for a fish tape that will overcome the shortcomings of the prior art devices.

Another object is to provide a refurbishing device for a fish tape that will save time, since the electrician has the ability to complete installation of wiring after reconditioning the fish tape in the field.

An additional object is to provide a refurbishing device for a fish tape that will reduce expenses by saving the cost of labor needed for personnel to go and purchase a replacement and return, or return at another time with a new fish tape to complete the installation.

A further object is to provide a refurbishing device for a fish tape that is simple and easy to use.

A still further object is to provide a refurbishing device for a fish tape that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Figure 1:
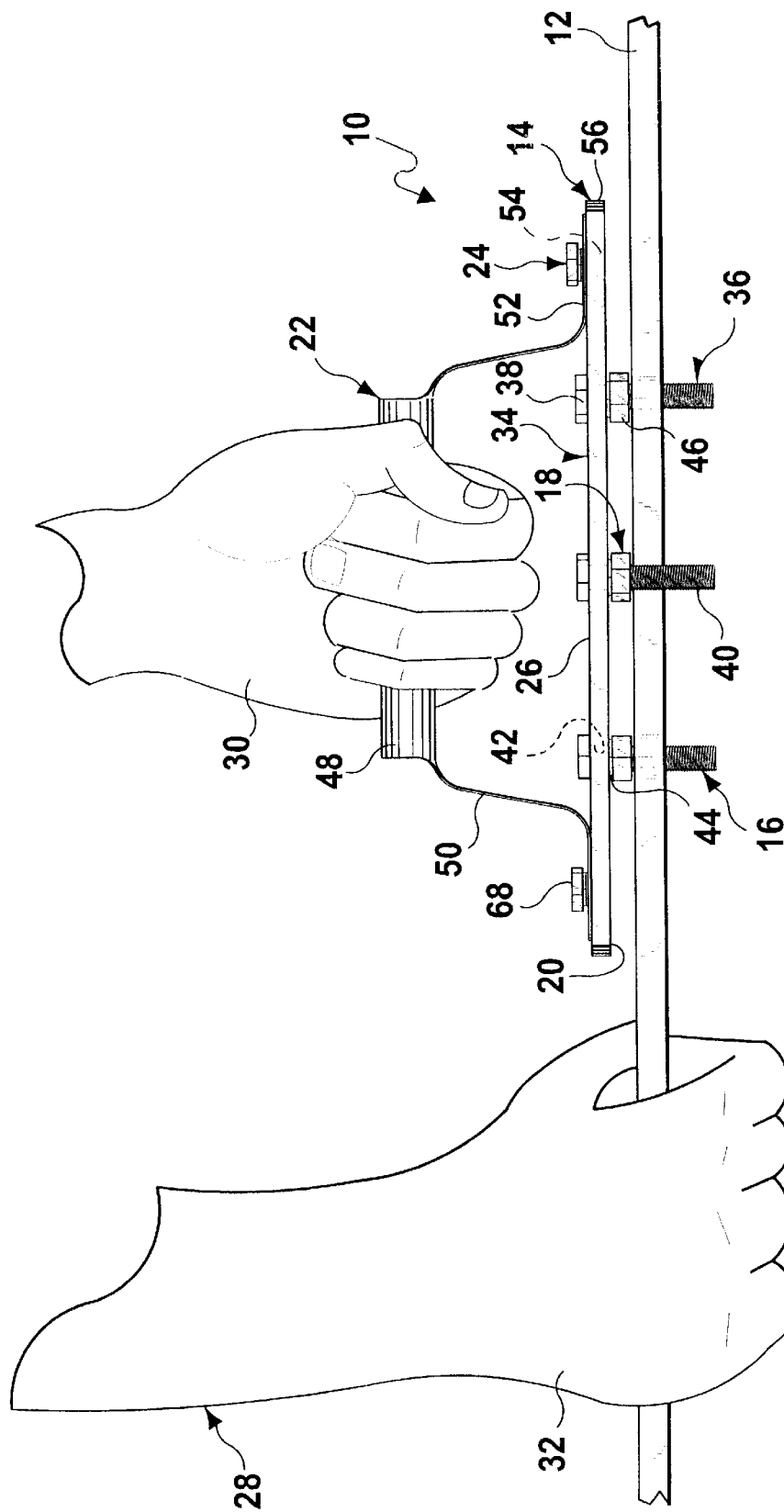
FIG. 1 is a front elevational view of the present invention in use.
Figure 2:
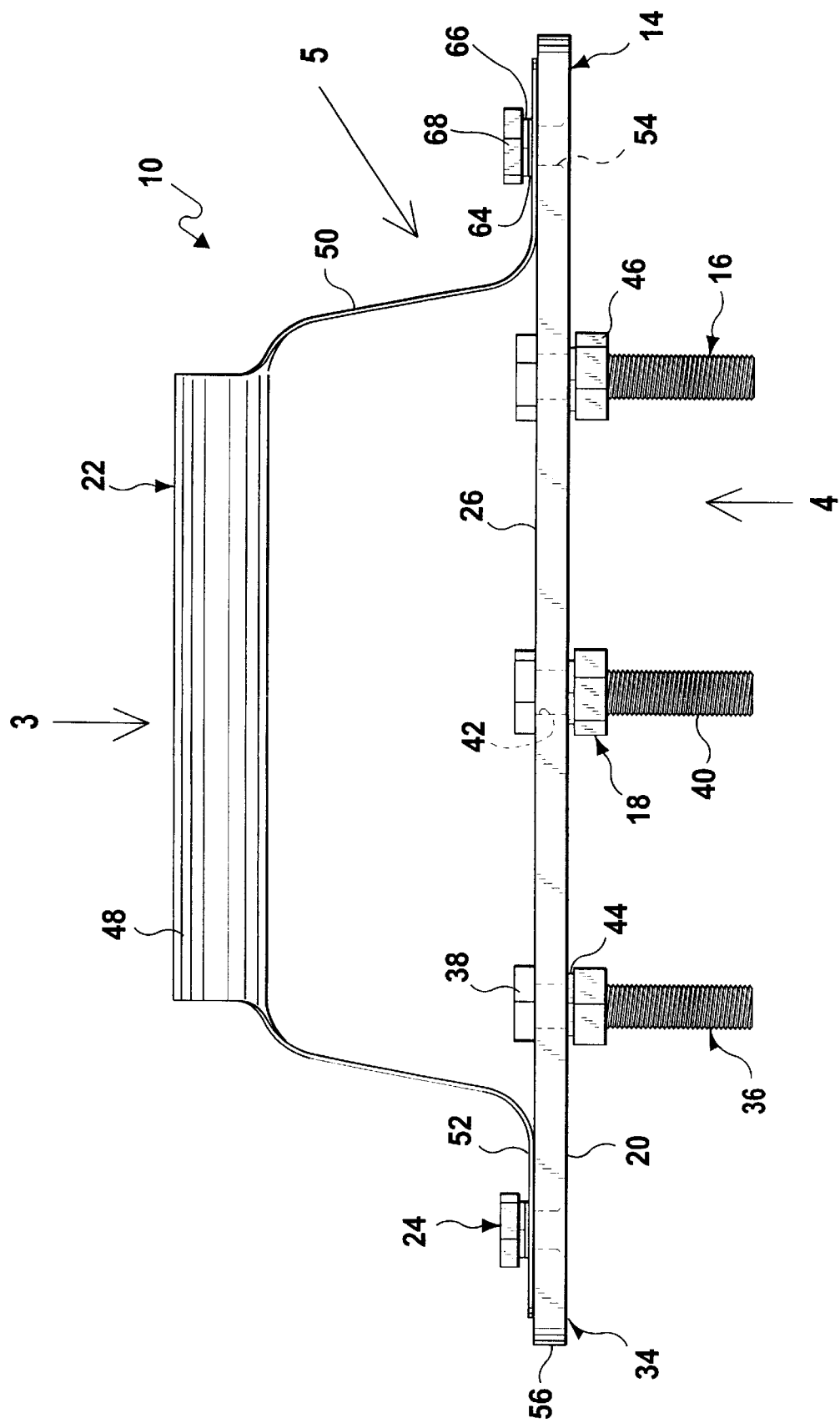
FIG. 2 is an enlarged front elevational view of the present invention per se.
Figure 3:
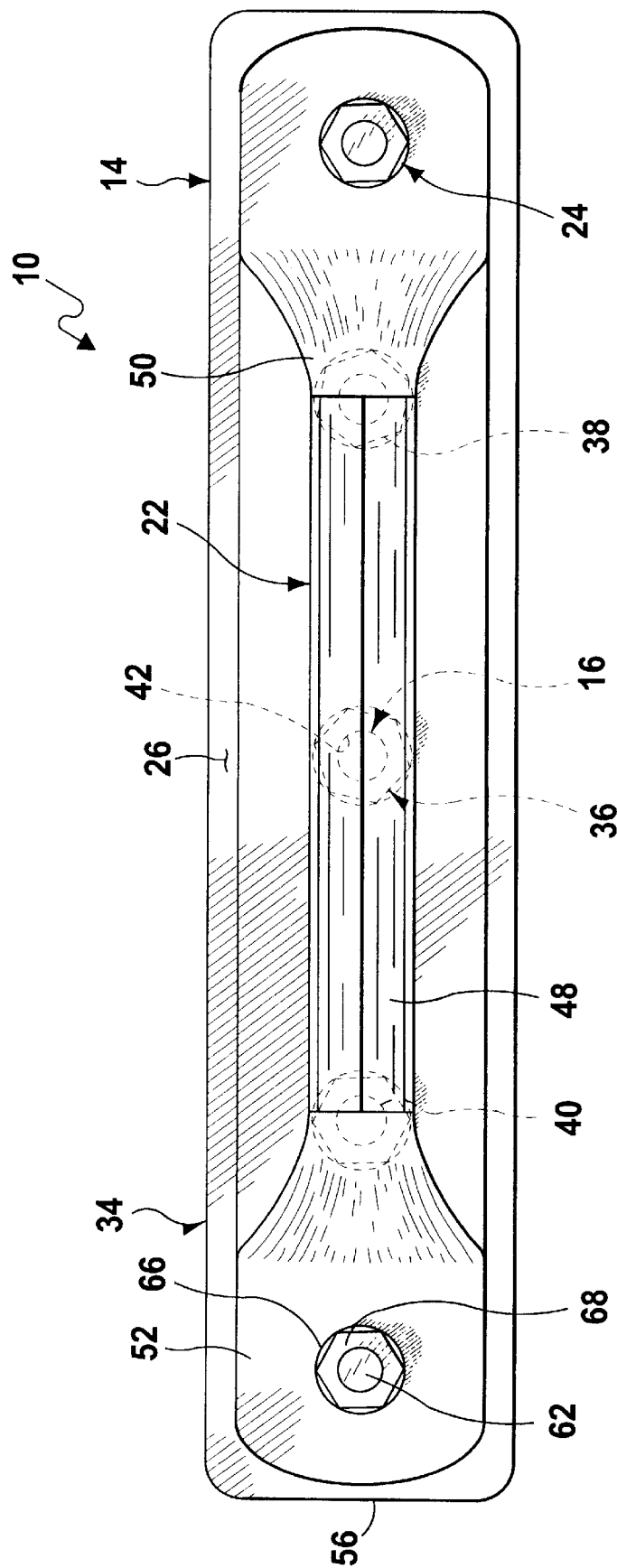
FIG. 3 is a top plan view taken in the direction of arrow 3 in FIG. 2.

Turning now descriptively to the drawings, in which similar reference characters denote similar elements throughout the several views, FIGS. 1 through 6 illustrate the present invention being a refurbishing device 10 for a fish tape 12. With regard to the reference numerals used, the following numbering is used throughout the various drawings figures.

10 refurbishing device
12 fish tape
14 base of 10
16 stud of 10
18 studs attaching assembly of 10
20 bottom side of 14
22 handle of 10
24 handle securing assemblage of 10
26 top side of 14
28 person
30 first hand of 28

32 second hand of 28
34 rectangular plate for 14
36 bolt for 16
38 head of 36
40 threaded shank of 36
42 threaded aperture in 14 of 18
44 lock washer of 18 on 40
46 nut of 18 on 40
48 tubular hand grip of 22
50 arm of 22 on 48
52 flange of 22 on 50
54 countersunk hole in 14 of 24
56 end of 14
58 opening in 52 of 24
60 flat head bolt of 24
62 threaded shank of 60
64 washer of 24 on 62
66 lock washer of 24 on 62
68 nut of 24 on 62
70 strong durable material (aluminum) for 14
72 strong durable material (stainless steel for 16

The refurbishing device 10 for the fish tape 12 comprises a base 14 and three studs 16. An assembly 18 is for attaching the studs 16 in equally spaced apart locations through the base 14, so that the studs 16 will extend from a bottom side 20 of the base 14. A handle 22 is also provided. An assemblage 24 is for securing the handle 22 to a top side 26 of the base 14 opposite from the studs 16. A person 28 can grasp the handle 22 with a first hand 30 and pull the coiled fish tape 12 between the studs 16 approximately three times with a second hand 32, thus reconditioning the fish tape 12 to like a new, straight and usable condition. The base 14 is a rectangular plate 34. Each stud 16 is a bolt 36, having a head 38 and a threaded shank 40.

The studs attaching assembly 18 includes the base 14 having three equally spaced and centrally located threaded apertures 42 therethrough. Each threaded shank 40 of each bolt 36 will be threaded completely through each threaded aperture 42, to extend from the bottom side 20 of the base 14 with each head 38 in engagement with the top side 26 of the base 14.

The studs attaching assembly 18 further contains three lock washers 44. Each lock washer 44 will fit upon each threaded shank 40 of each bolt 36. Three nuts 46 are provided. Each nut 46 will be threaded completely onto each threaded shank 40 of each bolt 36, to firmly retain each bolt 36 to the base 14.

The handle 22 comprises a tubular hand grip 48 and a pair of arms 50. Each arm 50 extends downwardly from one side of the tubular hand grip 48. A pair of flanges 52 are provided. Each flange 52 is integral with each arm 50 and extends at a right angle therefrom, so as to rest upon the top side 26 of the base 14.

The handle securing assemblage 24 includes the base 14 having two countersunk holes 54. Each countersunk hole 54 is centrally located adjacent one end 56 of the base 14 and extends from the bottom side 20 thereof. Each flange 52 of the handle 22 has an opening 58 therethrough in alignment with one countersunk hole 54 in the base 14. A pair of flat head bolts 60 each have a threaded shank 62. Each threaded shank 62 of each flat head bolt 60 will extend completely through each countersunk hole 54 in the base 14 from the bottom side 20 and each matching opening 58 in each flange 52 of the handle 22. A pair of washers 64 are provided. Each washer 64 will fit upon each threaded shank 62 of each flat head bolt 60. A pair of lock washers 66 are provided. Each lock washer 66 will fit upon each threaded shank 62 of each flat head bolt 60. And finally, a pair of nuts 68 are provided. Each nut 68 will be threaded completely onto each threaded shank 62 of each flat head bolt 60, to firmly hold each flange 52 of the handle 22 to the base 14.

Figure 4:
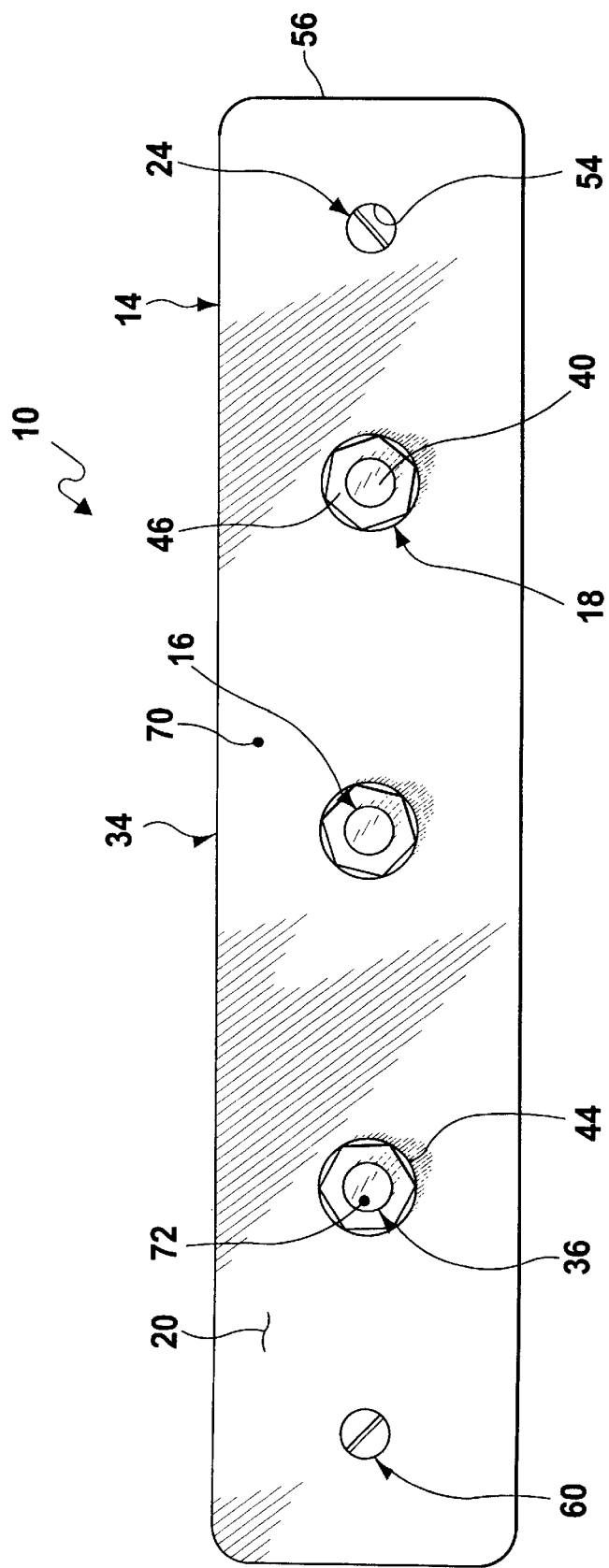
FIG. 4 is a bottom plan view taken in the direction of arrow 4 in FIG. 2.
Figure 5:
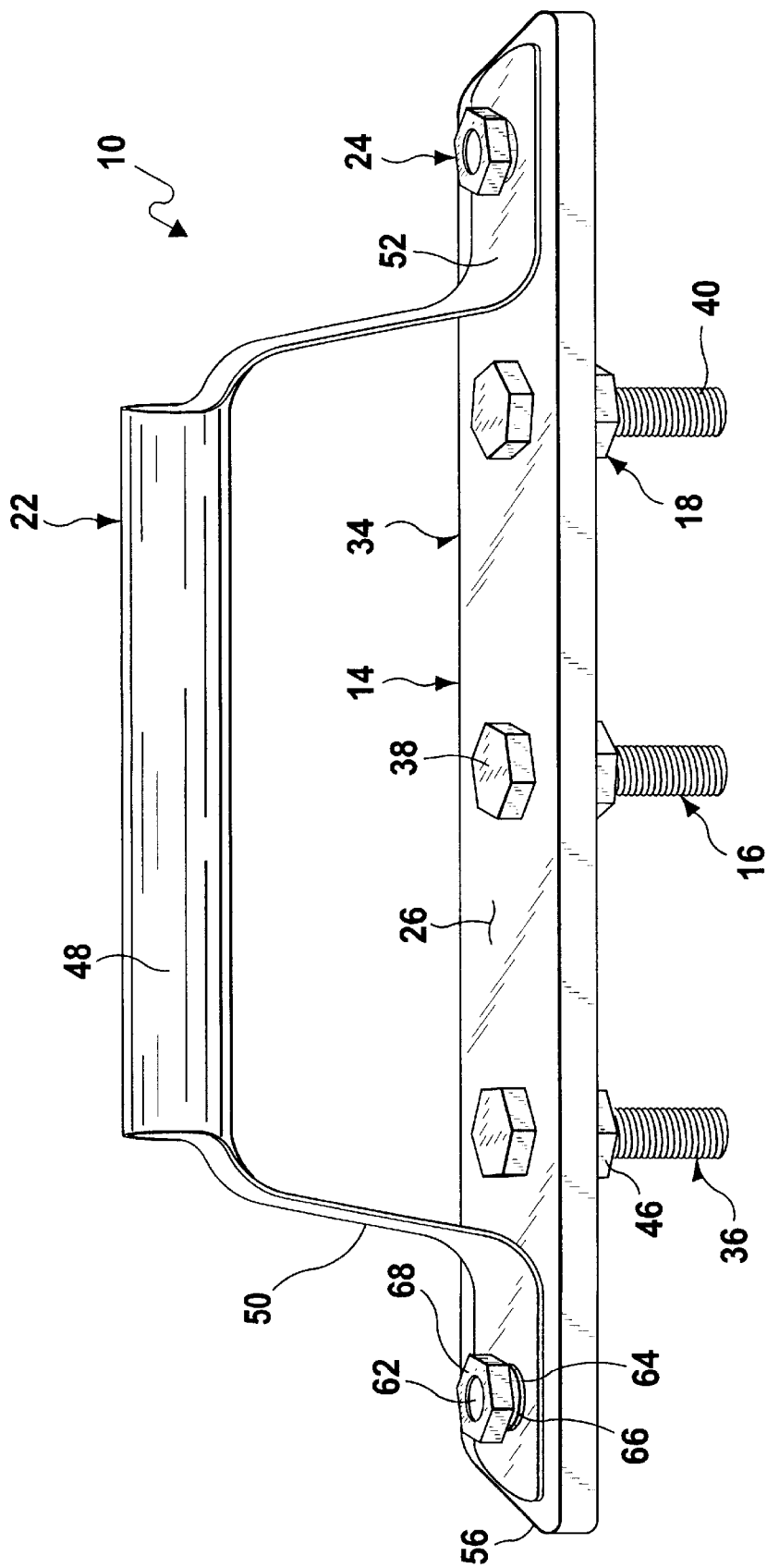
FIG. 5 is a perspective view taken in the direction of arrow 5 in FIG. 2.
Figure 6:
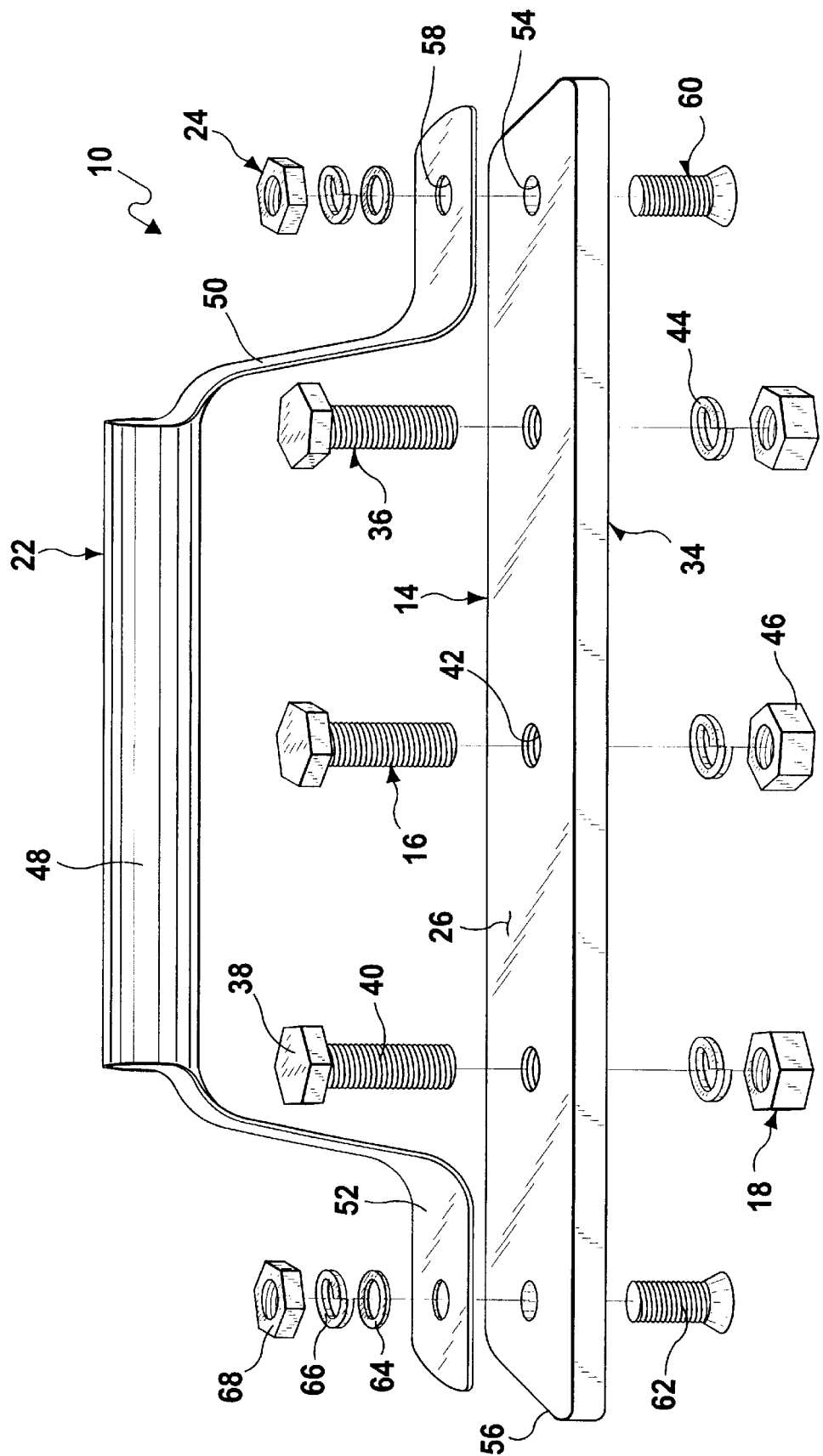
FIG. 6 is an exploded perspective view, showing the various components used in the assembly of the present invention.

As shown in FIG. 4, the base 14 is fabricated out of a strong durable material 70. The strong durable material 70 of the base 14 is aluminum. Each stud 16 is fabricated out of a strong durable material 72. The strong durable material 72 of each stud 16 is stainless steel.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A refurbishing device for a fish tape comprising:
    a) a base;
    b) three studs;
    c) means for attaching said studs in equally spaced apart locations through said base, so that said studs will extend from a bottom side of said base;
    d) a handle including:
        i) a tubula hand grip:
        ii) a pair of arms, in which each said arm extends downwardly from one side of said tubular hand grip; and
        iii) a pair of flanges, in which each said flange is integral with each said arm and extends at a right angle therefrom, so as to rest upon the too side of said base; and
    e) means for securing said handle to a top side of said base opposite from said studs, so that A person can grasp said handle with a first hand and pull a coiled fish tape between said studs approximately three times with a second hand, thus reconditioning the fish tape to a like new, straight and usable condition.

2. A refurbishing device for a fish tape as recited in claim 1, wherein said base is a rectangular plate.

3. A refurbishing device for a fish tape as recited in claim 1, wherein each said stud is a bolt having a head and a threaded shank.

4. A refurbishing device for a fish tape as recited in claim 3, wherein said studs attaching means includes said base having three equally spaced and centrally located threaded apertures therethrough, so that each said threaded shank of each said bolt will be threaded completely through each said threaded aperture to extend from the bottom side of said base with each said head in engagement with the top side of said base.

5. A refurbishing device for a fish tape as recited in claim 4, wherein said studs attaching means further includes:
   a) three lock washers, wherein each said lock washer will fit upon each said threaded shank of each said bolt; and
   b) three nuts, wherein each said nut will be threaded completely onto each said threaded shank of each said bolt to firmly retain each said bolt to said base.

6. A refurbishing device for a fish tape as recited in claim 1, wherein said handle securing means includes:
   a) said base having two countersunk holes, in which each said countersunk hole is centrally located adjacent one end of said base and extends from the bottom side thereof;
   b) each said flange of said handle having an opening therethrough in alignment with one said countersunk hole in said base;
   c) a pair of flat head bolts each having a threaded shank, so that each said threaded shank of each said flat head bolt will extend completely through each said countersunk hole in said base from the bottom side and each said matching opening in each said flange of said handle;
   d) a pair of washers, wherein each said washer will fit upon each said threaded shank of each said flat head bolt;
   e) a pair of lock washers, wherein each said lock washer will fit upon each said threaded shank of each said flat head bolt; and
   f) a pair of nuts, wherein each said nut will be threaded completely onto each said threaded shank of each said flat head bolt to firmly hold each said flange of said handle to said base.

7. A refurbishing device for a fish tape as recited in claim 1, wherein said base is fabricated out of a strong durable material.

8. A refurbishing device for a fish tape as recited in claim 7, wherein said strong durable material is aluminum of said base.

9. A refurbishing device for a fish tape as recited in claim 1, wherein each said stud is fabricated out of a strong durable material.

10. A refurbishing device for a fish tape as recited in claim 9, wherein said strong durable material of each said stud is stainless steel.

11. A refurbishing device for a fish tape as recited in claim 2, wherein each said stud is a bolt having a head and a threaded shank.

12. A refurbishing device for a fish tape as recited in claim 13, wherein said studs attaching means includes said base having three equally spaced and centrally located threaded apertures therethrough, so that each said threaded shank of each said bolt will be threaded completely through each said threaded aperture to extend from the bottom side of said base with each said head in engagement with the top side of said base.

13. A refurbishing device for a fish tape as recited in claim 12, wherein said studs attaching means further includes:
   a) three lock washers, wherein each said lock washer will fit upon each said threaded shank of each said bolt; and
   b) three nuts, wherein each said nut will be threaded completely onto each said threaded shank of each said bolt to firmly retain each said bolt to said base.

14. A refurbishing device for a fish tape as recited in claim 5, wherein said handle securing means includes:
   a) said base having two countersunk holes, in which each said countersunk hole is centrally located adjacent one end of said base and extends from the bottom side thereof;
   b) each said flange of said handle having an opening therethrough in alignment with one said countersunk hole in said base;
   c) a pair of flat head bolts each having a threaded shank, so that each said threaded shank of each said flat head bolt will extend completely through each said countersunk hole in said base from the bottom side and each said matching opening in each said flange of said handle;
   d) a pair of washers, wherein each said washer will fit upon each said threaded shank of each said flat head bolt;
   e) a pair of lock washers, wherein each said lock washer will fit upon each said threaded shank of each said flat head bolt; and
   f) a pair of nuts, wherein each said nut will be threaded completely onto each said threaded shank of each said flat head bolt to firmly hold each said flange of said handle to said base.

15. A refurbishing device for a fish tape as recited in claim 14, wherein said base is fabricated out of a strong durable material.

16. A refurbishing device for a fish tape as recited in claim 15, wherein said strong durable material is aluminum of said base.

17. A refurbishing device for a fish tape as recited in claim 16, wherein each said stud is fabricated out of a strong durable material.

18. A refurbishing device for a fish tape as recited in claim 17, wherein said strong durable material of each said stud is stainless steel.

* * * * *